United States Patent
Alexander et al.

(10) Patent No.: US 10,164,783 B2
(45) Date of Patent: Dec. 25, 2018

(54) ENHANCING COLLABORATION IN REAL-TIME GROUP CHAT SYSTEM AND METHOD

(71) Applicant: International Business Machines Corporation, Armonk, NY (US)

(72) Inventors: Matthew R. Alexander, Raleigh, NC (US); Lisa M. Frankel, Acton, MA (US); Yuhong Yin, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 14/190,564

(22) Filed: Feb. 26, 2014

(65) Prior Publication Data
US 2015/0244538 A1  Aug. 27, 2015

(51) Int. Cl.
*H04L 12/18* (2006.01)
*H04L 12/58* (2006.01)
(Continued)

(52) U.S. Cl.
CPC .......... *H04L 12/1813* (2013.01); *H04L 51/04* (2013.01); *H04L 65/4015* (2013.01); *H04L 65/4038* (2013.01); *G06Q 50/01* (2013.01)

(58) Field of Classification Search
None
See application file for complete search history.

(56) References Cited

U.S. PATENT DOCUMENTS

2005/0181878 A1\* 8/2005 Danieli .................. A63F 13/12
463/42
2007/0300165 A1\* 12/2007 Haveliwala ........... G06F 3/0482
715/758

(Continued)

FOREIGN PATENT DOCUMENTS

EP     1 222 549 B1    4/2013

OTHER PUBLICATIONS

Disclosed Anonymously, System and Method to Automatically Identify and Differentiate Contents Unique to a User in Group Chat Sessions, IP.com, IPCOM000203803D, Feb. 2, 2011.

(Continued)

*Primary Examiner* — Kevin T Bates
*Assistant Examiner* — Lesa M Kennedy
(74) *Attorney, Agent, or Firm* — Brian J. Colandreo, Esq.; Jeffrey T. Placker, Esq.; Holland & Knight LLLP

(57) ABSTRACT

A method, computer program product, and computer system for maintaining, between a plurality of participating computing devices, a collaboration session that includes a group instant messaging session within an object, wherein the plurality of participating computing devices includes a host computing device and one or more non-host computing devices in the group instant messaging session. A first sub-object of a plurality of sub-objects is generated within the object, wherein the first sub-object is rendered on the host computing device and the one or more non-host computing devices. Permission is assigned to the host computing device to edit content in the first sub-object, wherein the content in the first sub-object is rendered on the host computing device and the one or more non-host computing devices, and wherein the non-host computing devices are precluded from editing the content in the first sub-object.

11 Claims, 5 Drawing Sheets

(51) Int. Cl.
*H04L 29/06* (2006.01)
*G06Q 50/00* (2012.01)

(56) References Cited

U.S. PATENT DOCUMENTS

| | | | | |
|---|---|---|---|---|
| 2008/0082619 A1* | 4/2008 | Wanderski | ............ | G06Q 10/00 709/207 |
| 2008/0141146 A1* | 6/2008 | Jones | ............... | H04L 12/1822 715/753 |
| 2008/0242324 A1* | 10/2008 | Smuga | ............... | H04L 12/5895 455/466 |
| 2009/0100141 A1 | 4/2009 | Kirkland et al. | | |
| 2010/0037151 A1* | 2/2010 | Ackerman | ............ | G06Q 10/10 715/753 |
| 2010/0175003 A1* | 7/2010 | Castellucci | .......... | G06Q 10/107 715/758 |
| 2012/0023113 A1 | 1/2012 | Ferren et al. | | |
| 2013/0080927 A1 | 3/2013 | Weaver et al. | | |
| 2013/0091443 A1 | 4/2013 | Park et al. | | |
| 2013/0325982 A1* | 12/2013 | Krantz | ................... | H04L 51/04 709/206 |
| 2014/0359487 A1* | 12/2014 | Lee | ...................... | H04L 51/046 715/758 |

OTHER PUBLICATIONS

Disclosed Anonymously, Method of Rating one or more Messages in a Group Chat to Determine Important and Usefulness Messages, Ip.com, IPCOM000213879D, Jan. 3, 2012.

IBM, Graphical User Interface for Dynamically Creating Differing Perspectives of the Dialog Occurring in a Multiple Participant Instant Messaging Chat Session, IP.com, IPCOM000135236D, Apr. 5, 2006.

* cited by examiner

ENHANCING COLLABORATION IN REAL-TIME GROUP CHAT SYSTEM AND METHOD

BACKGROUND

A collaboration session may include such things as group instant messaging (IM) or "chat" technology, allowing users to communicate with multiple people in the same chat session in real-time. A group IM session may be used for any number of reasons, such as enabling a host of the group IM session to coordinate a large group of geographically diverse people to perform specific tasks, distributing dynamic information, and gathering immediate feedback. As the size of the group IM session increases, users may join and leave the group IM session at different times, engage in side conversations within the group IM session, and produce multiple comments (relevant and non-relevant) that require scrolling to find and review.

BRIEF SUMMARY OF DISCLOSURE

In one implementation, a method, performed by one or more computing devices, may include but is not limited to maintaining, between a plurality of participating computing devices, a collaboration session that may include a group instant messaging session within an object, wherein the plurality of participating computing devices may include a host computing device and one or more non-host computing devices in the group instant messaging session. A first sub-object of a plurality of sub-objects may be generated within the object, wherein the first sub-object may be rendered on the host computing device and the one or more non-host computing devices. Permission may be assigned to the host computing device to edit content in the first sub-object, wherein the content in the first sub-object may be rendered on the host computing device and the one or more non-host computing devices, and wherein the non-host computing devices may be precluded from editing the content in the first sub-object.

One or more of the following features may be included. Permission to at least one other computing device of the plurality of participating computing devices to edit the content in the first sub-object may be delegated by the host computing device. The first sub-object may include a non-group instant messaging session message rendered on the host computing device and the one or more non-host computing devices. The first sub-object may include a summary of messages from the group instant messaging session selected by the host computing device. The summary of messages from the group instant messaging session selected by the host computing device may be aggregated in an expandable list. A second sub-object of the plurality of sub-objects may be generated within the object by a first non-host computing device of the one or more non-host computing devices, wherein the second sub-object may be rendered on the first non-host computing device and excluded from rendering on a remaining portion of the plurality of participating computing devices. The second sub-object may include a summary of messages from the group instant messaging session selected by the first non-host computing device of the one or more non-host computing devices.

In another implementation, a computing system includes a processor and a memory configured to perform operations that may include but are not limited to maintaining, between a plurality of participating computing devices, a collaboration session that may include a group instant messaging session within an object, wherein the plurality of participating computing devices may include a host computing device and one or more non-host computing devices in the group instant messaging session. A first sub-object of a plurality of sub-objects may be generated within the object, wherein the first sub-object may be rendered on the host computing device and the one or more non-host computing devices. Permission may be assigned to the host computing device to edit content in the first sub-object, wherein the content in the first sub-object may be rendered on the host computing device and the one or more non-host computing devices, and wherein the non-host computing devices may be precluded from editing the content in the first sub-object.

One or more of the following features may be included. Permission to at least one other computing device of the plurality of participating computing devices to edit the content in the first sub-object may be delegated by the host computing device. The first sub-object may include a non-group instant messaging session message rendered on the host computing device and the one or more non-host computing devices. The first sub-object may include a summary of messages from the group instant messaging session selected by the host computing device. The summary of messages from the group instant messaging session selected by the host computing device may be aggregated in an expandable list. A second sub-object of the plurality of sub-objects may be generated within the object by a first non-host computing device of the one or more non-host computing devices, wherein the second sub-object may be rendered on the first non-host computing device and excluded from rendering on a remaining portion of the plurality of participating computing devices. The second sub-object may include a summary of messages from the group instant messaging session selected by the first non-host computing device of the one or more non-host computing devices.

In another implementation, a computer program product resides on a computer readable storage medium that has a plurality of instructions stored on it. When executed by a processor, the instructions cause the processor to perform operations that may include but are not limited to maintaining, between a plurality of participating computing devices, a collaboration session that may include a group instant messaging session within an object, wherein the plurality of participating computing devices may include a host computing device and one or more non-host computing devices in the group instant messaging session. A first sub-object of a plurality of sub-objects may be generated within the object, wherein the first sub-object may be rendered on the host computing device and the one or more non-host computing devices. Permission may be assigned to the host computing device to edit content in the first sub-object, wherein the content in the first sub-object may be rendered on the host computing device and the one or more non-host computing devices, and wherein the non-host computing devices may be precluded from editing the content in the first sub-object.

One or more of the following features may be included. Permission to at least one other computing device of the plurality of participating computing devices to edit the content in the first sub-object may be delegated by the host computing device. The first sub-object may include a non-group instant messaging session message rendered on the host computing device and the one or more non-host computing devices. The first sub-object may include a summary of messages from the group instant messaging session selected by the host computing device. The summary of messages from the group instant messaging session selected by the host computing device may be aggregated in an expandable list. A second sub-object of the plurality of sub-objects may be generated within the object by a first non-host computing device of the one or more non-host computing devices, wherein the second sub-object may be rendered on the first non-host computing device and excluded from rendering on a remaining portion of the plurality of participating computing devices. The second sub-object may include a summary of messages from the group instant messaging session selected by the first non-host computing device of the one or more non-host computing devices.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
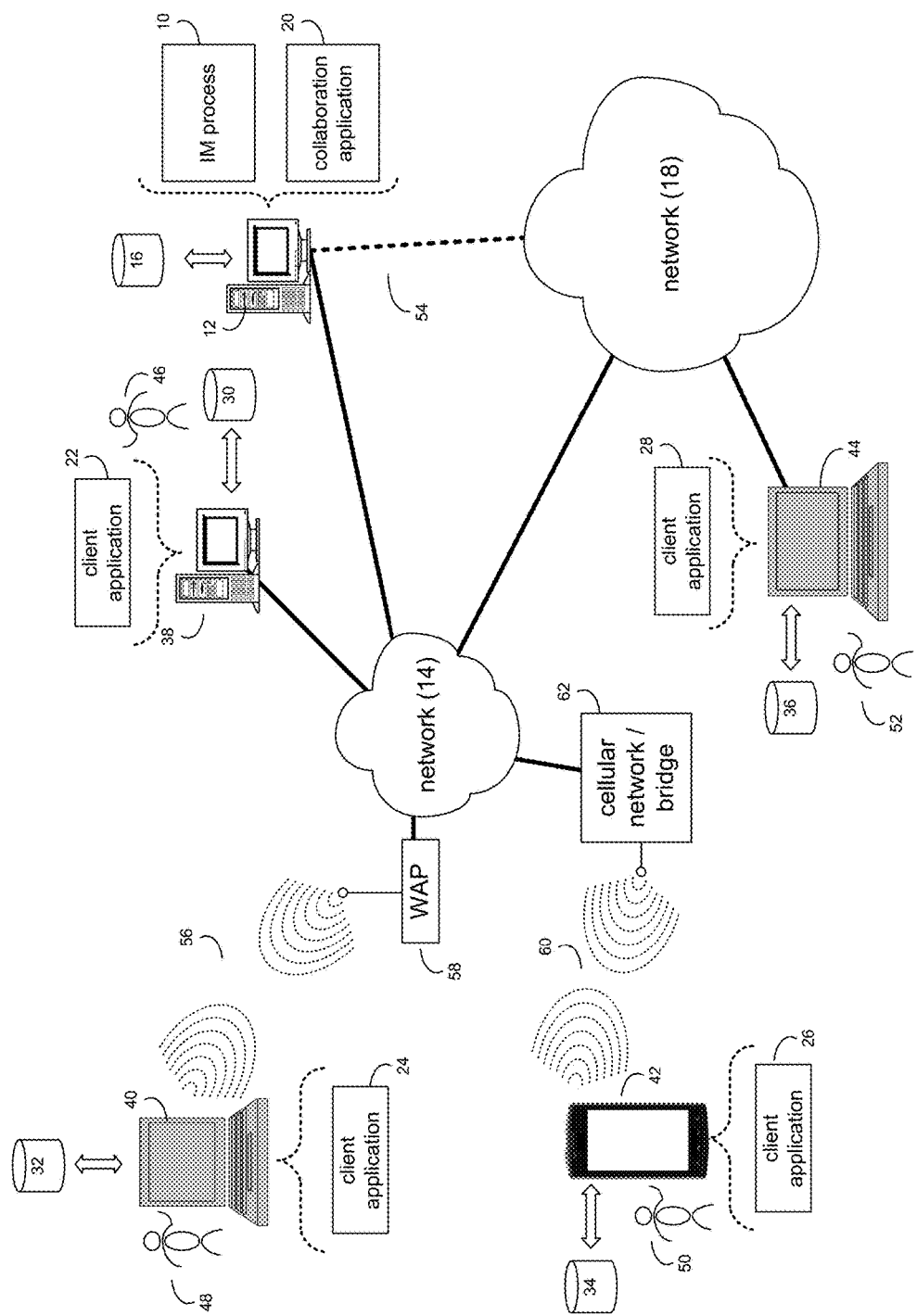
FIG. 1 is an illustrative diagrammatic view of an IM process coupled to a distributed computing network according to one or more implementations of the present disclosure.

System Overview:

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, there is shown IM process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, IM process 10 may maintain, between a plurality of participating computing devices, a collaboration session that may include a group instant messaging session within an object, wherein the plurality of participating computing devices may include a host computing device and one or more non-host computing devices in the group instant messaging session. A first sub-object of a plurality of sub-objects may be generated within the object, wherein the first sub-object may be rendered on the host computing device and the one or more non-host computing devices. Permission may be assigned to the host computing device to edit content in the first sub-object, wherein the content in the first sub-object may be rendered on the host computing device and the one or more non-host computing devices, and wherein the non-host computing devices may be precluded from editing the content in the first sub-object.

The instruction sets and subroutines of IM process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may execute a collaboration application (e.g., collaboration application 20), examples of which may include, but are not limited to, e.g., a web conferencing application, a video conferencing application, a voice-over-IP application, a video-over-IP application, Instant Messaging (IM)/"chat" application, or other application that allows for virtual meeting and/or remote collaboration. IM process 10 and/or collaboration application 20 may be accessed via client applications 22, 24, 26, 28. IM process 10 may be a stand alone application, or may be an applet/application/script/extension that may interact with and/or be executed within collaboration application 20, a component of collaboration application 20, and/or one or more of client applications 22, 24, 26, 28. Collaboration application 20 may be a stand alone application, or may be an applet/application/script/extension that may interact with and/or be executed within IM process 10, a component of IM process 10, and/or one or more of client applications 22, 24, 26, 28. One or more of client applications 22, 24, 26, 28 may be a stand alone application, or may be an applet/application/script/extension that may interact with and/or be executed within and/or be a component of IM process 10 and/or collaboration application 20. Examples of client applications 22, 24, 26, 28 may include, but are not limited to, e.g., a web conferencing application, a video conferencing application, a voice-over-IP application, a video-over-IP application, Instant Messaging (IM)/"chat" application, or other application that allows for virtual meeting and/or remote collaboration, a standard and/or mobile web browser, an email client application, a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of IM process 10 (and vice versa). Accordingly, IM process 10 may be a purely server-side application, a purely client-side application, or a hybrid server-side/client-side application that is cooperatively executed by one or more of client applications 22, 24, 26, 28 and/or IM process 10.

One or more of client applications 22, 24, 26, 28 may be configured to effectuate some or all of the functionality of collaboration application 20 (and vice versa). Accordingly, collaboration application 20 may be a purely server-side application, a purely client-side application, or a hybrid server-side/client-side application that is cooperatively executed by one or more of client applications 22, 24, 26, 28 and/or collaboration application 20. As one or more of client applications 22, 24, 26, 28, IM process 10, and collaboration application 20, taken singly or in any combination, may effectuate some or all of the same functionality, any description of effectuating such functionality via one or more of client applications 22, 24, 26, 28, IM process 10, collaboration application 20, or combination thereof, and any described interaction(s) between one or more of client applications 22, 24, 26, 28, IM process 10, collaboration application 20, or combination thereof to effectuate such functionality, should be taken as an example only and not to limit the scope of the disclosure.

Users 46, 48, 50, 52 may access computer 12 and IM process 10 (e.g., using one or more of client electronic devices 38, 40, 42, 44) directly through network 14 or through secondary network 18. Further, computer 12 may be connected to network 14 through secondary network 18, as illustrated with phantom link line 54. IM process 10 may include one or more user interfaces, such as browsers and textual or graphical user interfaces, through which users 46, 48, 50, 52 may access IM process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
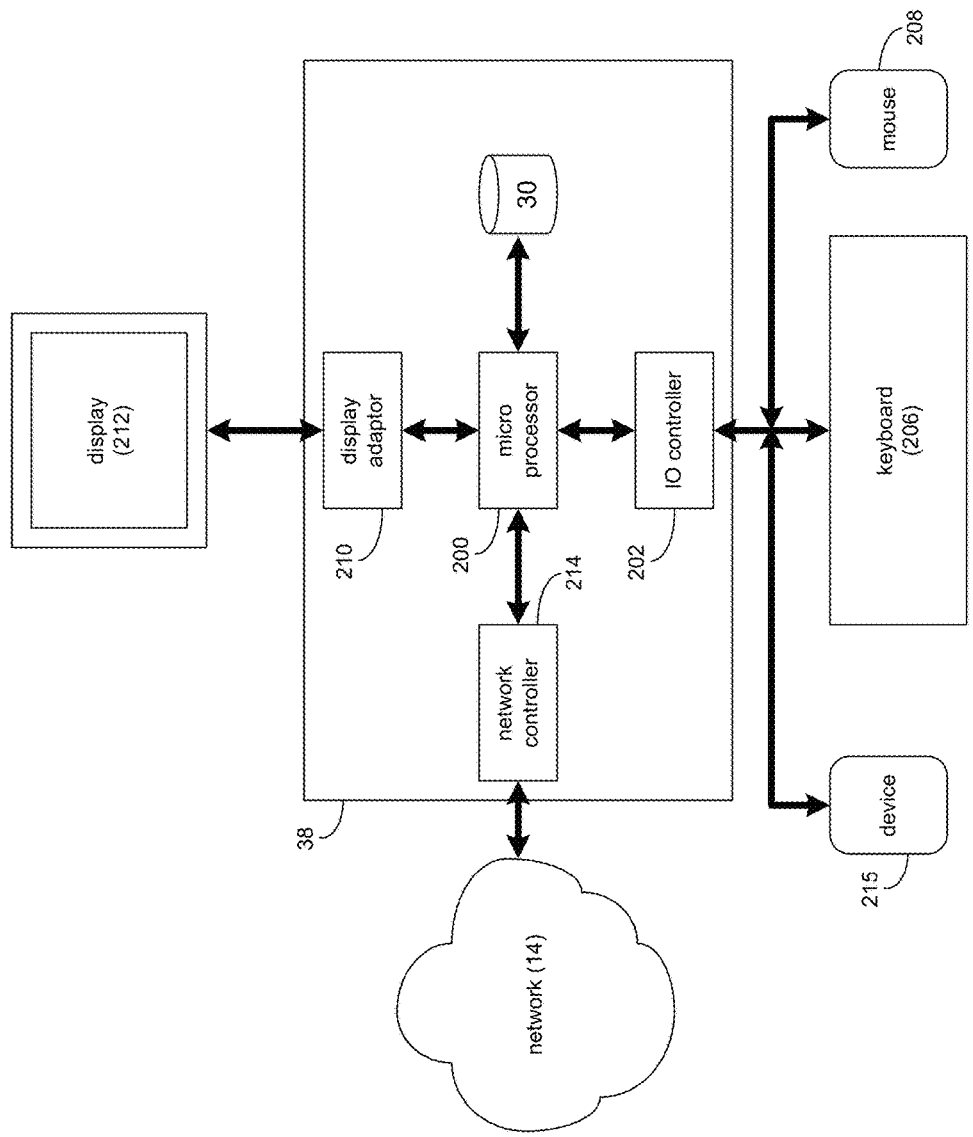
FIG. 2 is a diagrammatic view of a client electronic device of FIG. 1 according to one or more implementations of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, IM process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

Figure 3:
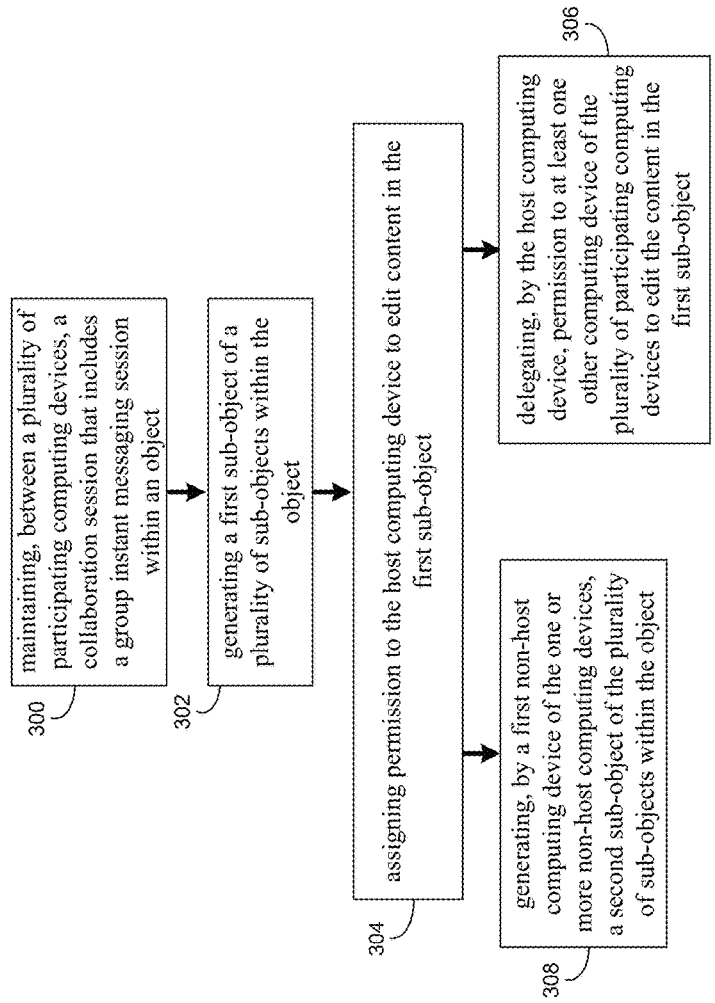
FIG. 3 is an illustrative flowchart of the IM process of FIG. 1 according to one or more implementations of the present disclosure.
Figure 4:
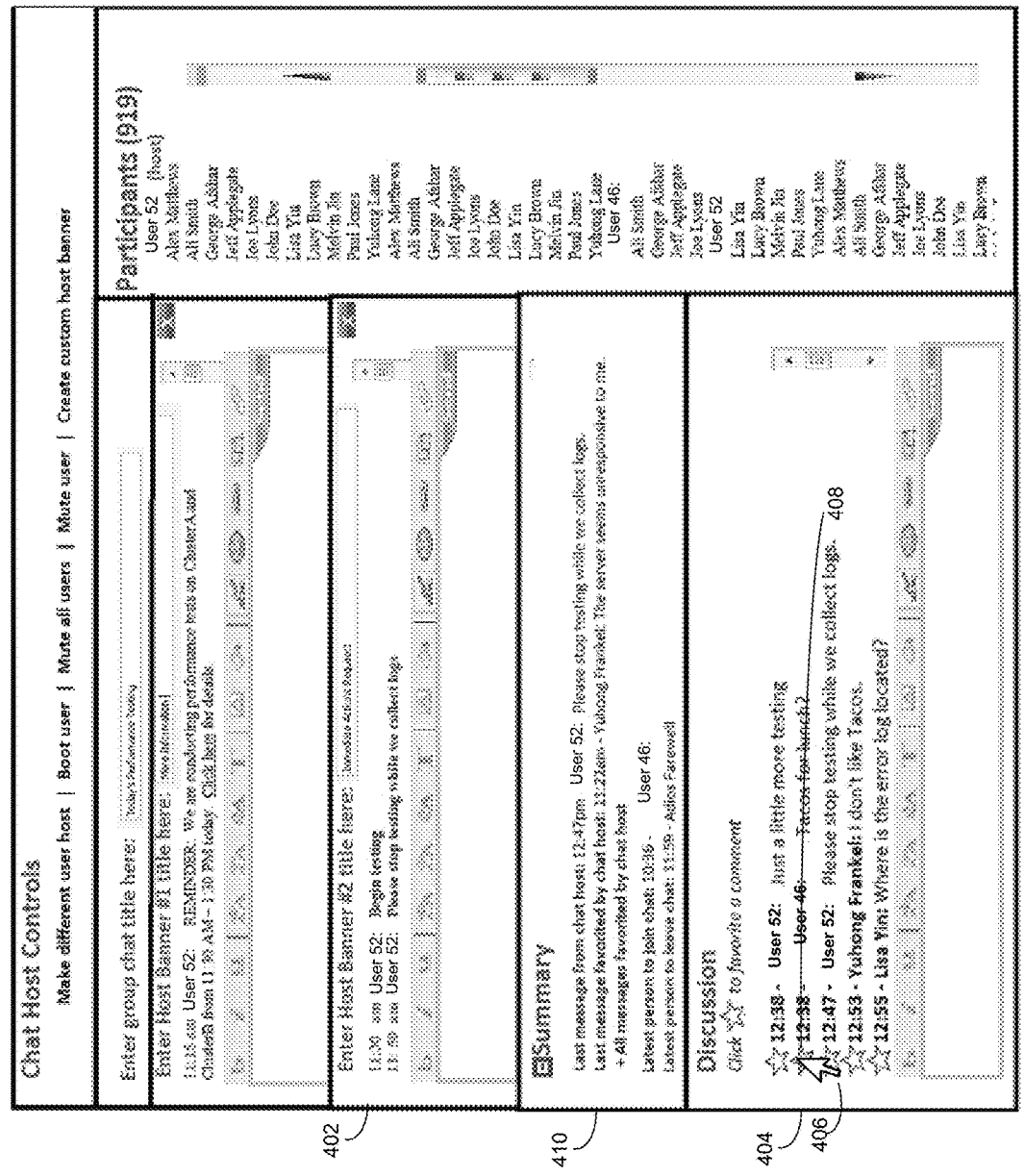
FIG. 4 is an illustrative diagrammatic view of a screen image displayed by the IM process of FIG. 1 according to one or more implementations of the present disclosure.
Figure 5:
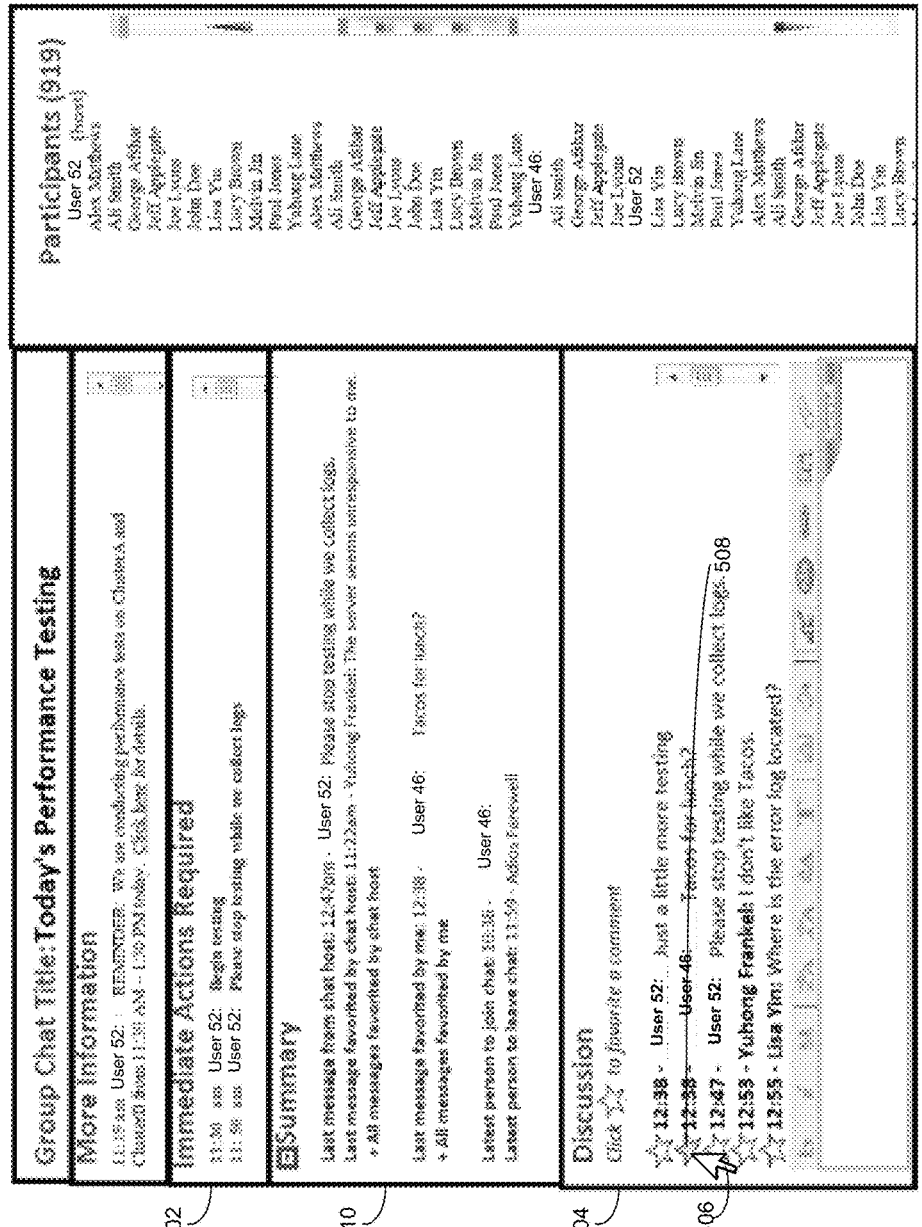
FIG. 5 is an illustrative diagrammatic view of a screen image displayed by the IM process of FIG. 1 according to one or more implementations of the present disclosure.

The IM Process:

As discussed above and referring also to FIGS. 3-5, IM process 10 may maintain 300, between a plurality of participating computing devices, a collaboration session that may include a group instant messaging session within an object, wherein the plurality of participating computing devices may include a host computing device and one or more non-host computing devices in the group instant messaging session. IM process 10 may generate 302 a first sub-object of a plurality of sub-objects within the object, wherein the first sub-object may be rendered on the host computing device and the one or more non-host computing devices. IM process 10 may assign 304 permission to the host computing device to edit content in the first sub-object, wherein the content in the first sub-object may be rendered on the host computing device and the one or more non-host computing devices, and wherein the non-host computing devices may be precluded from editing the content in the first sub-object.

As discussed above, a collaboration session may include such things as group instant messaging (IM) or "chat" technology, allowing users to communicate with multiple people in the same chat session in real-time. A group IM session may be used for any number of reasons, such as enabling a host of the group IM session to coordinate a large group of geographically diverse people to perform specific tasks, distributing dynamic information, and gathering immediate feedback. As the size of the group IM session increases, it may become difficult to follow all of the information that is relevant to the group IM session, since different users may constantly join and leave the group IM session at different times, engage in side conversations within the group IM session, and produce multiple comments (relevant and non-relevant) that require scrolling to find and review.

For instance, assume for example purposes only that a group of, e.g., 200 employees at Company XYZ, are tasked with stress testing a server. In the example, they may need to ping the server at precise times while the host (e.g., server administrator) collects data. Further in the example, assume the host (e.g., user 52) starts a group IM session. In the example, although user 52 invites 200 employees to participate in the group IM session, only 190 employees have joined the group IM session thus far. Nonetheless, user 52 decides to start the stress-testing session. User 52 then uses the group IM session object (e.g., window) to instruct the group IM session participants to start stress testing the server. Now assume that after 10 minutes, user 52 uses the group IM session window to instruct the group IM session participants to stop testing and wait so that user 52 may collect data. Further assume that while the group IM session testers wait, they start to discuss their lunch plans in the group IM session window, where a discussion ensues about which sandwich shop makes the best club sandwich.

Now assume that the 191$^{st}$ user (e.g., user 46) joins the group IM session. User 46 may be confused as to where things stand with the server stress testing because user 46 only sees the group IM session window filled with discussions about sandwiches, resulting in scrolling out of view of the earlier IM message from user 52 for all participants to stop testing. User 46 assumes that they should be stress testing the server based on the subject of the group IM session, so user 46 pings the server, resulting in the corruption of the data being collected by user 52.

It may be possible to provide a level of customization to allow hosts and/or other participants of the group IM session to help determine what information is relevant. For instance, in some implementations, IM process 10 may maintain 300, between a plurality of participating computing devices, a collaboration session that may include a group instant messaging session within an object (e.g., window 400), wherein the plurality of participating computing devices may include a host computing device and one or more non-host computing devices in the group instant messaging session. For instance, referring at least to FIG. 4 and continuing with the above example, IM process 10 may maintain 300 a group IM session between a plurality of computing devices, which may include a host computing device (e.g., computing device 44) and one or more non-host computing devices (e.g., computing device 38 and computing device 40). IM process 10 may generate window 400 as the designated user interface window as seen from the point of view of host computing device 44.

In some implementations, IM process 10 may generate 302 a first sub-object of a plurality of sub-objects within the object, wherein the first sub-object may be rendered on the host computing device (i.e., the computing device associated with the host of the group IM session, in the example) and the one or more non-host computing devices (i.e., the computing devices associated with non-host participants of the group IM session, in the example). For instance, and continuing with the above example, IM process 10 may generate 302 a first sub-object (e.g., sub-window) within window 400, which may be rendered by IM process 10 on host computing device 44, as well as non-host computing devices 38 and 40. In some implementations, and referring at least to FIG. 5, IM process 10 may generate window 500 as the designated user interface window as seen from the point of view of, e.g., non-host computing devices 38, which is different from the point of view of host computing device 44 in window 400.

For example, in some implementations, the first sub-object may include a non-group instant messaging session message rendered on the host computing device and the one or more non-host computing devices. For instance, the first sub-object may include sub-window 402. In the example, sub-window 402 may include a non-group IM session message (i.e., an IM that is disseminated by host computing device 44 to non-host computing devices 38 and 40, but via a sub-window (within the same group IM session) that is different from the sub-window where IMs from all the group IM session participants are disseminated and received, such as sub-window 404). Put another way, sub-window 402 may be generally described as a "banner" message, by which an IM specifically sent by host computing device 44 may be rendered on non-host computing devices 38 and 40 via sub-window 502. By contrast, any IMs sent via sub-window 404 and/or sub-window 504 may be rendered in each respective sub-window 404/504. In the above-example, if user 52 (via IM process 10) had sent the non-group IM session message in sub-window 402, that message would have been rendered in sub-window 502 such that user 46 may have been able to more easily view it to know not to ping the server, rather than missing that message due to it being lost in the group IM session window filled with discussions about sandwiches.

IM process 10 may assign 304 permission to the host computing device to edit content in the first sub-object, wherein the content in the first sub-object may be rendered on the host computing device and the one or more non-host computing devices, and wherein the non-host computing devices may be precluded from editing the content in the first sub-object. For instance, and continuing with the above example, while an IM specifically sent by host computing device 44 (e.g., via IM process 10) may be rendered on host computing device 44 via sub-window 402 thus being rendered on non-host computing devices 38 and 40 via sub-window 502, non-host computing devices 38 and 40 are precluded from editing content in sub-window 402. For example, non-host computing devices 38 and 40 may be precluded from sending any IMs via sub-window 502, which may result in IMs being rendered via sub-window 402 and/or 502. Thus, IM process 10 has only assigned 304 permission to host computing device 44 to edit content in sub-window 402.

In some implementations, IM process 10 may delegate 306 permission by the host computing device to at least one other computing device of the plurality of participating computing devices to edit the content in the first sub-object. For instance, assume for example purposes only that user 52 would like to allow user 46 to become a host of the group IM session (permanently and/or temporarily). In the example, user 52 (e.g., via IM process 10) may delegate 306 permission to user 46 (via computing device 38) to edit the content in sub-window 502, thus being rendered on host computing device 44 via sub-window 402 and all other participating computing devices in the group IM session via their respective "banner" sub-windows (not shown). In some implementations, when permission is delegated 306 to user 46, user 46 may be highlighted or otherwise augmented in a list of users participating in the group IM session. It will be appreciated that any permissions provided to the host computing device (e.g., the ability to delegate 306 editing permission to one or more sub-windows, the ability to remove one or more participants from the group IM session, the ability to mute one or more participants from entering further IMs, the ability to edit a subject/title of the group IM session, etc.), as well as other permissions not discussed, may be delegated 306 without departing from the scope of the disclosure.

In some implementations, the first sub-object may include a summary of messages from the group instant messaging session selected by the host computing device. For instance, and referring at least to FIG. 4, assume for example purposes only that user 52 decides that a particular IM sent by user 46 (via computing device 38) is important and should be "favorited". In the example, user 52 (via host computing device 44 and IM process 10) may use a pointing device (e.g., cursor 406) to select an object (e.g., icon 408) to denote that the particular IM sent by user 46 is important. In some implementations, the summary of messages from the group instant messaging session selected by the host computing device may be aggregated in an expandable list. The expandable list is shown by example in sub-window 410 in FIG. 4. In some implementations, similarly to the above-discussion pertaining to sub-window 402 of host computing device 44, sub-window 410 may be rendered on host computing device 44 and non-host computing devices 38 and 40 (e.g., via sub-window 510), where only host computing devices (e.g., host computing device 44) may be assigned 304 permission to edit sub-window 410. In some implementations, sub-window 410 of host computing device 44 may be rendered only on host computing device 44 and not rendered on one or more other participating computing devices (host and/or non-host computing devices). Sub-window 410 may include other information, such as, e.g., the last IM that the host sent, the last IM that the host marked as a favorite, the last participant to join the group IM session, the last participant to leave the group IM session, as well as other information.

In some implementations, IM process 10 may generate 308 a second sub-object of the plurality of sub-objects within the object by a first non-host computing device of the one or more non-host computing devices, wherein the second sub-object may be rendered on the first non-host computing device and excluded from rendering on a remaining portion of the plurality of participating computing devices. For example, and referring at least to FIGS. 4 and 5, similarly to sub-window 410 of host computing device 44 may be rendered only on host computing device 44 and not rendered on one or more other participating computing devices, sub-window 510 of non-host computing device 38 may be generated 308 (e.g., rendered) only on non-host computing device 38 and not rendered on one or more other participating computing devices. As such, each participating user, including user 46, is provided (via IM process 10) with the ability to customize window 500 with one or more sub-windows (e.g., sub-window 510) that may be rendered only for user 46 on their individual computing device (e.g., non-host computing device 38).

In some implementations, the second sub-object may include a summary of messages from the group instant messaging session selected by the first non-host computing device of the one or more non-host computing devices. For instance, assume for example purposes only that user 46 decides that a particular IM sent by user 52 (via computing device 44) is important and should be "favorited". In the example, user 46 (via host computing device 38 and IM process 10) may use a pointing device (e.g., cursor 406) to select an object (e.g., icon 508) to denote that the particular IM sent by user 52 is important. In some implementations, the summary of messages from the group instant messaging session selected by the non-host computing device may be aggregated in an expandable list. The expandable list is shown by example in sub-window 510 in FIG. 5. As discussed above, sub-window 510 may include the summary of messages from the group instant messaging session selected by the host computing device (e.g., aggregated in an expandable list). In some implementations, sub-window 510 may include other information, such as, e.g., the last IM that the host and/or user 46 sent, the last IM that the host and/or user 46 marked as a favorite, the last participant to join the group IM session, the last participant to leave the group IM session, as well as other information.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer program product residing on a non-transitory computer readable storage medium having a plurality of instructions stored thereon which, when executed by a processor, cause the processor to perform operations comprising:

maintaining, between a plurality of participating computing devices, a collaboration session that includes a group instant messaging session within an object, wherein the plurality of participating computing devices includes a host computing device and one or more non-host computing devices in the group instant messaging session;

generating a first sub-object of a plurality of sub-objects within the object, wherein the first sub-object is rendered on the host computing device and the one or more non-host computing devices, wherein the first sub-object includes a non-group instant messaging session message rendered on the host computing device and the one or more non-host computing devices, wherein the non-group instant messaging session is described by a configurable host banner, wherein the first sub-object rendered on the host computing device and the one or more non-host computing devices includes a summary of a plurality of messages from the group instant messaging session selected by the host computing device, wherein the first sub-object includes a last message sent by the host computing device, wherein the summary of the plurality of messages from the group instant messaging session selected by the host computing device is aggregated in an expandable list, wherein a last message selected by the host computing device from the plurality of messages is displayed in the first sub-object and the other selected messages are not displayed when the expandable list is collapsed;

generating, by a first non-host computing device of the one or more non-host computing devices, a second sub-object of the plurality of sub-objects within the object, wherein the second sub-object is rendered on the first non-host computing device and excluded from rendering on a remaining portion of the plurality of participating computing devices, wherein the second sub-object rendered on the first non-host computing device and excluded from rendering on the remaining portion of the plurality of participating computing devices includes a summary of a plurality of messages from the group instant messaging session selected by the first non-host computing device, wherein the summary of the plurality of messages from the group instant messaging session selected by the first non-host computing device is aggregated in an expandable list, wherein a last message selected by the first non-host computing device from the plurality of messages is displayed in the second sub-object and the other selected messages are not displayed when the expandable list is collapsed;

assigning permission to the host computing device to edit content in the first sub-object, wherein the content in the first sub-object is rendered on the host computing device and the one or more non-host computing devices, and wherein the non-host computing devices are precluded from editing the content in the first sub-object; and delegating, by the host computing device, permission to at least one other computing device of the plurality of participating computing devices to one or more of the ability to remove one or more participants from the group instant messaging session and the ability to mute one or more participants from entering further instant messages.

2. The computer program product of claim 1 wherein the summary of the one or more messages from the group instant messaging session selected by the host computing device is aggregated in an expandable list.

3. The computer program product of claim 1 further comprising delegating, by the host computing device, permission to at least one other computing device of the plurality of participating computing devices to edit the content in the first sub-object.

4. A computing system including a processor and a memory configured to perform operations comprising:

maintaining, between a plurality of participating computing devices, a collaboration session that includes a group instant messaging session within an object, wherein the plurality of participating computing devices includes a host computing device and one or more non-host computing devices in the group instant messaging session;

generating a first sub-object of a plurality of sub-objects within the object, wherein the first sub-object is rendered on the host computing device and the one or more non-host computing devices, wherein the first sub-object includes a non-group instant messaging session message rendered on the host computing device and the one or more non-host computing devices, wherein the non-group instant messaging session is described by a configurable host banner, wherein the first sub-object rendered on the host computing device and the one or more non-host computing devices includes a summary of a plurality of messages from the group instant messaging session selected by the host computing device, wherein the first sub-object includes a last message sent by the host computing device, wherein the summary of the plurality of messages from the group instant messaging session selected by the host computing device is aggregated in an expandable list, wherein a last message selected by the host computing device from the plurality of messages is displayed in the first sub-object and the other selected messages are not displayed when the expandable list is collapsed;

generating, by a first non-host computing device of the one or more non-host computing devices, a second sub-object of the plurality of sub-objects within the object, wherein the second sub-object is rendered on the first non-host computing device and excluded from rendering on a remaining portion of the plurality of participating computing devices, wherein the second sub-object rendered on the first non-host computing device and excluded from rendering on the remaining portion of the plurality of participating computing devices includes a summary a plurality of messages from the group instant messaging session selected by the first non-host computing device, wherein the summary of the plurality of messages from the group instant messaging session selected by the first non-host computing device is aggregated in an expandable list, wherein a last message selected by the first non-host computing device from the plurality of messages is displayed in the second sub-object when the expandable list is collapsed;

assigning permission to the host computing device to edit content in the first sub-object, wherein the content in the first sub-object is rendered on the host computing device and the one or more non-host computing devices, and wherein the non-host computing devices are precluded from editing the content in the first sub-object; and delegating, by the host computing device, permission to at least one other computing device of the plurality of participating computing devices to one or more of the ability to remove one or more participants from the group instant messaging session and the ability to mute one or more participants from entering further instant messages.

5. The computing system of claim 4 wherein the summary of the one or more messages from the group instant messaging session selected by the host computing device is aggregated in an expandable list.

6. The computer program product of claim 1 wherein the first sub-object includes one or more of a last participant to join the group instant messaging session, and a last participant to leave the group instant messaging session.

7. The computing system of claim 4 wherein the second sub-object includes one or more of a last message sent by the host computing device, a last participant to join the group instant messaging session, and a last participant to leave the group instant messaging session.

8. The computer program product of claim 1 wherein the second sub-object includes one or more of a last message sent by the first non-host computing device, a last participant to join the group instant messaging session, and a last participant to leave the group instant messaging session.

9. The computing system of claim 4 wherein the first sub-object includes one or more of a last participant to join the group instant messaging session, and a last participant to leave the group instant messaging session.

10. The computer program produce of claim 1, wherein generating the first sub-object includes rendering a copy of the one or more messages selected by the host computing device from the group instant messaging session within the first sub-object.

11. The computing system of claim 4, wherein generating the first sub-object includes rendering a copy of the one or more messages selected by the host computing device from the group instant messaging session within the first sub-object.

* * * * *